(12) United States Patent
Molnö et al.

(10) Patent No.: US 6,898,195 B1
(45) Date of Patent: May 24, 2005

(54) METHOD AND APPARATUS FOR SUSTAINING CONVERSATIONAL SERVICES IN A PACKET SWITCHED RADIO ACCESS NETWORK

(75) Inventors: Johan Molnö, Bromma (SE); Kumar Balachandran, Cary, NC (US); Christofer Lindheimer, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/568,452

(22) Filed: May 9, 2000

(51) Int. Cl.[7] ............................................... H04Q 7/00
(52) U.S. Cl. ..................................... 370/329; 370/437
(58) Field of Search ................................ 370/329, 330, 370/336, 337, 341, 437, 433, 435, 347, 389

(56) References Cited

U.S. PATENT DOCUMENTS

| | | | | |
|---|---|---|---|---|
| 4,949,395 A | | 8/1990 | Rydbeck | 455/33 |
| 5,420,851 A | * | 5/1995 | Seshadri et al. | 370/280 |
| 5,475,869 A | | 12/1995 | Gomi et al. | 455/63 |
| 5,519,779 A | | 5/1996 | Proctor et al. | 380/34 |
| 5,612,955 A | * | 3/1997 | Fernandes et al. | 370/433 |
| 5,754,537 A | * | 5/1998 | Jamal | 370/330 |
| 5,812,965 A | * | 9/1998 | Massaloux | 704/205 |
| 5,940,380 A | * | 8/1999 | Poon et al. | 370/330 |
| 6,438,115 B1 | * | 8/2002 | Mazur et al. | 370/330 |
| 6,477,176 B1 | * | 11/2002 | Hamalainen et al. | 370/435 |
| 6,480,472 B1 | * | 11/2002 | Jou et al. | 370/252 |
| 6,519,260 B1 | * | 2/2003 | Galyas et al. | 370/395.42 |
| 6,577,862 B1 | * | 6/2003 | Davidson et al. | 370/433 |
| 6,631,274 B1 | * | 10/2003 | Keshavachar | 455/466 |

FOREIGN PATENT DOCUMENTS

| | | |
|---|---|---|
| EP | 0 872 982 A1 | 10/1998 |
| EP | 1 006 695 A1 | 6/2000 |
| WO | WO 9624200 A1 * | 8/1996 |
| WO | WO 9632817 A1 * | 10/1996 |
| WO | WO 98/35523 | 8/1998 |
| WO | WO 98/37706 | 8/1998 |

OTHER PUBLICATIONS

ETSI EN 300 963 V8.0.1, Digital Cellular Telecommunications System; Full Speech; Comfort Noise Aspect for Full Rate Speec Traffic Channels. 1999. pp. 5–7.*

Bruhn. S. et al., "Continuous and Discontinuous Power Reduced Transmission of Speech Inactivity for the GSM System", GLOBECOM 98, The Bridge to Global Integration. IEEE Global Telecommunications Conference, 1998. Nov. 8–12, 1998. vol. 4 pp. 2091–2096.*

Guo, et al.; "Agressive Packet Reservation Multiple Access Using Signatures" *IEEE International Symposium on Personal, Indoor and Mobile Radio Communications*, Sep. 18, 1994; pp. 1247–1253.

EPO, Standard European Search Report, Nov. 10, 2000.

U.S. Appl. No. 09/568,451, filed May 9, 2000, Védrine.

U.S. Appl. No. 09/527,415, filed Mar. 17, 2000, Védrine.

* cited by examiner

*Primary Examiner*—John Pezzlo
*Assistant Examiner*—Donald L Mills

(57) ABSTRACT

In a packet switched system used for speech communication, a user entering a silent period, start to transmit silence descriptor information (SID). According to the invention, a speech user is not allocated the same resources for transmission of SID as for the speech communication. Instead, the user is, upon entering a silent period, reallocated to a SID communication channel, shared between a number of different users in silent mode. The resources used for speech may then be more advantageously utilized for other speech users, and is not occupied for SID transmissions only. In an alternate embodiment of the invention, when a mobile station is in silent mode, it receives and transmits associated signaling information on the same transmission resources as those used for the SID transmissions.

28 Claims, 9 Drawing Sheets

| Frame | Timeslot | | | | | | | |
|---|---|---|---|---|---|---|---|---|
| | TN0 | TN1 | TN2 | TN3 | TN4 | TN5 | TN5 | TN7 |
| 0 | ■ | | | | | | | |
| 1 | ■ | | | | | | | |
| 2 | ■ | | | | | | | |
| 3 | ■ | | | | | | | |
| 4 | ■ | | | | | | | |
| 5 | ■ | | | | | | | |
| 6 | ■ | | | | | | | |
| 7 | ■ | | | | | | | |
| 8 | ■ | | | | | | | |
| 9 | ■ | | | | | | | |
| 10 | ■ | | | | | | | |
| 11 | ■ | | | | | | | |
| 12 | ■ | | | | | | | |
| 13 | ■ | | | | | | | |
| 14 | ■ | | | | | | | |
| 15 | ■ | | | | | | | |
| 16 | ■ | | | | | | | |
| 17 | ■ | | | | | | | |
| 18 | ■ | | | | | | | |
| 19 | ■ | | | | | | | |
| 20 | ■ | | | | | | | |
| 21 | ■ | | | | | | | |
| 22 | ■ | | | | | | | |
| 23 | ■ | | | | | | | |
| 24 | ■ | | | | | | | |
| 25 | ■ | | | | | | | |
| 26 | ■ | | | | | | | |
| 27 | ■ | | | | | | | |
| 28 | ■ | | | | | | | |
| 29 | ■ | | | | | | | |
| 30 | ■ | | | | | | | |
| 31 | ■ | | | | | | | |
| 32 | ■ | | | | | | | |
| 33 | ■ | | | | | | | |
| 34 | ■ | | | | | | | |
| 35 | ■ | | | | | | | |
| 36 | ■ | | | | | | | |
| 37 | ■ | | | | | | | |
| 38 | ■ | | | | | | | |
| 39 | ■ | | | | | | | |
| 40 | ■ | | | | | | | |
| 41 | ■ | | | | | | | |
| 42 | ■ | | | | | | | |
| 43 | ■ | | | | | | | |
| 44 | ■ | | | | | | | |
| 45 | ■ | | | | | | | |
| 46 | ■ | | | | | | | |
| 47 | ■ | | | | | | | |
| 48 | ■ | | | | | | | |
| 49 | ■ | | | | | | | |
| 50 | ■ | | | | | | | |
| 51 | ■ | | | | | | | |

FIG 2

|  | TN0 | TN1 | TN2 | TN3 | TN4 | TN5 | TN6 | TN7 |
|---|---|---|---|---|---|---|---|---|
|  | .. |  |  | SPEECH(U1) |  |  |  |  |
|  | .. |  |  | SPEECH(U1) |  |  |  |  |
|  | .. |  |  | SPEECH(U1) |  |  |  |  |
|  | .. |  |  | SPEECH(U1) |  |  |  |  |
|  | .. |  |  | SID(1)+Realloc |  |  |  |  |
|  | .. |  |  | Available |  |  |  |  |
|  | .. |  |  | Available |  |  |  |  |
| 1 | SID(0) |  |  | Available |  |  |  |  |
| 2 | SID(1) |  |  | Available |  |  |  |  |
| 3 | SID(2) |  |  | Available |  |  |  |  |
| . | ~~SID(3)~~ First speech(US2) +Realloc |  |  | Available |  |  |  |  |
| . | . |  |  | SPEECH(U2) |  |  |  |  |
| . | . |  |  | SPEECH(U2) |  |  |  |  |
| N-m | SID(N-m-1) |  |  | SPEECH(U2) |  |  |  |  |
|  | ~~Spare~~ SID(3) |  |  | SPEECH(U2) |  |  |  |  |
|  | Spare.. |  |  | .. |  |  |  |  |
| N | ... |  |  |  |  |  |  |  |
| 1 | SID(0) |  |  |  |  |  |  |  |
| 2 | SID(1) |  |  |  |  |  |  |  |
| . | etc |  |  |  |  |  |  |  |

FIG 3

| | TN0 | TN1 | TN2 | TN3 | TN4 | TN5 | TN6 | TN7 |
|---|---|---|---|---|---|---|---|---|
| | | | | SPEECH(U1) | | | | |
| | | | | SPEECH(U1) | | | | |
| | | | | SPEECH(U1) | | | | |
| | | | | FIRST SID(1) + realloc. request | | | | |
| | | | | | | | | |
| | | | | | | | | |
| 1 | SID(0) | | | | | | | |
| 2 | SID(1) | | | | | | | |
| 3 | SID(2) | | | | | | | |
| . | SID(3) | | | | | | | |
| . | . | | | | | | | |
| . | . | | | | | | | |
| . | . | | | | | | | |
| N | SID(N-1) | | | | | | | |
| 1 | SID(0) | | | | | | | |
| 2 | SID(1) | | | | | | | |
| . | . | | | | | | | |
| . | . | | | | | | | |

FIG 6

| TN0 | 1 | 2 | 3 | 4 | 5 | 6 | 7 |
|---|---|---|---|---|---|---|---|
| SID(0) | | | | | | | |
| SID(1) | | | | | | | |
| PSACCH(2) | | | | | | | |
| ... | | | | | | | |
| ... | | | | | | | |
| ... | | | | | | | |
| SID(0) | | | | | | | |
| PSACCH(1) | | | | | | | |
| SID(2) | | | | | | | |
| ... | | | | | | | |
| ... | | | | | | | |
| ... | | | | | | | |
| PSACCH(0) | | | | | | | |
| SID(1) | | | | | | | |
| SID(2) | | | | | | | |
| ... | | | | | | | |
| ... | | | | | | | |
| ... | | | | | | | |
| SID(0) | | | | | | | |
| SID(1) | | | | | | | |
| PSACCH(2) | | | | | | | |
| | | | | | | | |
| | | | | | | | |
| | | | | | | | |
| | | | | | | | |

FIG 8

METHOD AND APPARATUS FOR SUSTAINING CONVERSATIONAL SERVICES IN A PACKET SWITCHED RADIO ACCESS NETWORK

CROSS REFERENCE TO RELATED APPLICATION

This application is related to an application entitled "Method and System for Fast Access to an Uplink Channel in a Mobile Communications Network" Ser. No. 09/527,415, filed Mar. 17, 2000, and an applications entitled "Method and System for Fast Access to an Uplink Channel in a Mobile communications Network" Ser. No. 09/568,451), filed May 9, 2000. The applications are incorporated by reference herein.

BACKGROUND OF THE INVENTION

The present invention generally relates to wireless communication. More specifically, the invention relates to a method and apparatus for multiplexing real-time users in a packet switched radio communication system.

There is presently ongoing a paradigm shift in telecommunication. Historically, the telecommunications industry has been focusing on voice communication over fixed lines or radio communication links like, e.g., cellular telephony systems like Global System for Mobile communication (GSM). Communication has typically been transmitted in a circuit switched manner, i.e., with dedicated connections between users or end nodes. Circuit switched communication requires continuous allocation of physical transmission resources, or communication channels, for the whole duration of a connection, regardless of the actual use of the connection.

With the explosive growth of Internet traffic however, the focus has shifted towards more efficient ways of transferring data communication in a telecommunication network. Packet switched communication protocols has been developed, e.g., General Packet Radio Service (GPRS) to be used together with GSM and the Time Division Multiple Access (TDMA) system compliant to the TIA/EIA-136 standard. The advantage with these packet switched communication protocols is that there is no need to have physical transmission resources reserved for users that are not making use of it. For example, a user may share a transmission resource with one or several other users and occupy the resource only when there is user data to send. If there is no data to send during certain periods, other users may utilize the transmission resources. This is a more efficient way of allocating users onto physical channels than the circuit switched strategy, where a user is always a sole owner of a communication channel.

With the identification of packet switched methods as being an efficient way of transferring data, the next step is basically a step back. The focus is again on voice, but it is also a step forward in that the aim is now set on voice over packet switched communication, or more generally, real-time services over packet switched communication channels. With this and other aims, there will be a large variety of services carried over packet switched communication channels, services with completely different demands in terms of delay, delay variations (jitter) and error rates. For example, a web browsing session may not suffer seriously from being slightly delayed, it is however important that the transfer is error free. For voice communication, it is basically the other way around; a voice conversation is extremely sensitive to delay and delay variations but may perhaps tolerate a non-zero error rate and still provide acceptable quality.

In the Universal Mobile Telecommunications System (UMTS), there are four proposed classes defined to further characterize different services and the respective Quality of Service (QoS) demands: conversational, streaming, interactive and background. One main distinguishing factor between these classes is delay related. The conversational class is intended for delay sensitive traffic, such as speech, while the background class is the most delay insensitive class. Conversational and streaming classes are intended to be used to carry real-time traffic flows and interactive and background classes are intended to carry, e.g., Internet applications like WWW-browsing, file transfer and e-mail services.

As voice communication involves constraints on delay, it does not tolerate the sharing of a transmission resource, or physical channel, as liberally as the fundamentals of packet switched communication allow. It is necessary to introduce priority for voice users over, e.g., a background user on the same channel, such that the real-time aspects of the voice connection may be maintained.

In an exemplar voice call, there are typically periods of silence in one direction when the other direction speaks, and vice versa. With circuit switched radio communication connections, it is possible to utilize these silent periods and decrease the output power from the transmitter while a voice stream from a speech coder is paused. This will mean a system gain in terms of less interference. The physical communication channels, e.g., in terms of frequency, timeslot or code is however still occupied. There may however be even more to gain if other users could be multiplexed onto the same physical channel during these speech pauses. By using packet switched methods for transferring voice communication of the conversational class, it will become possible to more efficiently make use of the transmission resources while in a period of speech silence. One way to do this is to allocate the resources to a best effort user, e.g., of the background or interactive class, while in a silence period and maintain the high priority for the conversational class user. Thus, it will be easy to, as soon as a silence period is interrupted by a speech period, prioritize allocation of the conversational class again. With this flexible method of allocating shared resources, it will be possible to allocate more users than the number of available transmission resources or channels. If there is a high number of transmission resources, it may even be possible to allocate more voice users than the number of channels, assuming that it is highly unlikely that all users need transmission resources at the same time. This strategy is usually referred to as statistical multiplexing.

For the Adaptive Multi-Rate (AMR) speech coder structure of GSM, as in many other speech coders designed for circuit switched connections, the silent periods discussed above are not completely transmission free, i.e., the transmission resources are still utilized. During a silent period, when no speech is processed, the speech coder generates what can be referred to as a Silence Descriptor (SID). This silence descriptor is transmitted according to some repetition rate in order to generate "comfort noise" in the receiving end. It is typically the case in a voice communication that there is no complete silence, and to "simulate" the noise usually present in the surroundings of the silent speaker, SIDs are transmitted with a certain repetition rate. The SIDs defined for circuit switched speech are traditionally transmitted on the same physical resource as the regular voice communication.

If a packet switched system is considered, the silent periods should optimally enable allocation of other users onto the physical communication channel, e.g., background or interactive class users. It would of course be possible to do this and still transmit SIDs from a conversational user also. However, if one consider utilizing a communication channel for more than one conversational user in one way or another (e.g., statistical multiplexing), the SID transmissions that are continuously repeated with some repetition pattern will pose a problem, since a continuous allocation for e.g., another real-time user will be impossible. There is thus a need to develop and prepare techniques to more efficiently allocate resources and allow a more flexible scheduling, than what is possible with the presently used SID techniques.

SUMMARY OF THE INVENTION

In one aspect of the present invention, allocation of conversational users that are in a silence period is made on a single predetermined communication channel. All users that are allocated on one of a certain number of predetermined channels for traffic communication and that are in a silent period are re-allocated to the single predetermined communication channel for SID transmissions. Thus, the resources on the channels used for e.g., conversational transmission is not used for SID transmissions, but may instead be utilized by allocating another user thereon. As soon as a user enters a silent period in one direction, a reallocation to the shared SID transmission resources takes the user away from the resources used for the, e.g., conversational transmission.

In another, aspect of the present invention a Packet Slow Associated Control Channel (PSACCH) is allocated to share transmission resources with the SID transmissions. The PSACCH is allocated in a certain repetition pattern on the same physical communication channels as the SID transmissions, such that users receiving SID transmissions also receive PSACCH transmissions with a certain repetition rate.

In another aspect of the present invention, when leaving a downlink (in the direction from the base station to the mobile station) silence- or pause period, the first data block, e.g., containing speech data, is transmitted together with a channel allocation on the same communication channel, utilizing the same transmission resources as for the previously mentioned SID and PSACCH transmissions. This will advantageously handle allocation delays in the downlink, that would otherwise be introduced in the beginning of an active period. The SIDs associated with other users, that would normally be transmitted on the transmission resources that instead is used for a first data and allocation block are delayed until transmission resources are available again on the "SID PSACCH" communication channel.

In yet another aspect of the present invention, downlink transmission resources are made available, such that, when stealing SID resources for a first data and allocation block, the SID is displaced and transmitted during a sequence of one or more periods on the same channel, that are not part of any repetitive SID or PSACCH transmission.

In yet another aspect of the present invention, uplink allocation of SID transmissions on a shared resource is made by assigning to a user in a silent period, a periodic repetition starting from a certain frame number and optionally a frame number offset.

BRIEF DESCRIPTION OF THE DRAWINGS

Features, objects and advantages of the present invention will become apparent to those skilled in the art by reading the following detailed description where references will be made to the appended figures in which;

FIG. 2 illustrates a timeslot and frame divisioning according to GSM specification.

FIG. 3 illustrates how SID blocks from different users in the downlink are multiplexed onto one common SID communication channel and how users leaving silence periods are allocated to speech communication resources according to one embodiment of the present invention.

FIG. 6 illustrates how SID blocks from different users in the uplink are multiplexed onto one common SID communication channel according to one embodiment of the present invention.

FIG. 8 illustrates a SID communication channel where PSACCH transmissions are multiplexed with SID transmissions according to another embodiment of the present invention.

DETAILED DESCRIPTION

The invention will now be described making references to a GPRS/EGPRS based cellular packet data communication system and extensions and variants thereof, as briefly described in the background. It should be understood that the invention is not limited to these types of systems. In general, all TDMA based systems where real-time applications are transmitted over a packet switched channel may be considered.

Figure 1:
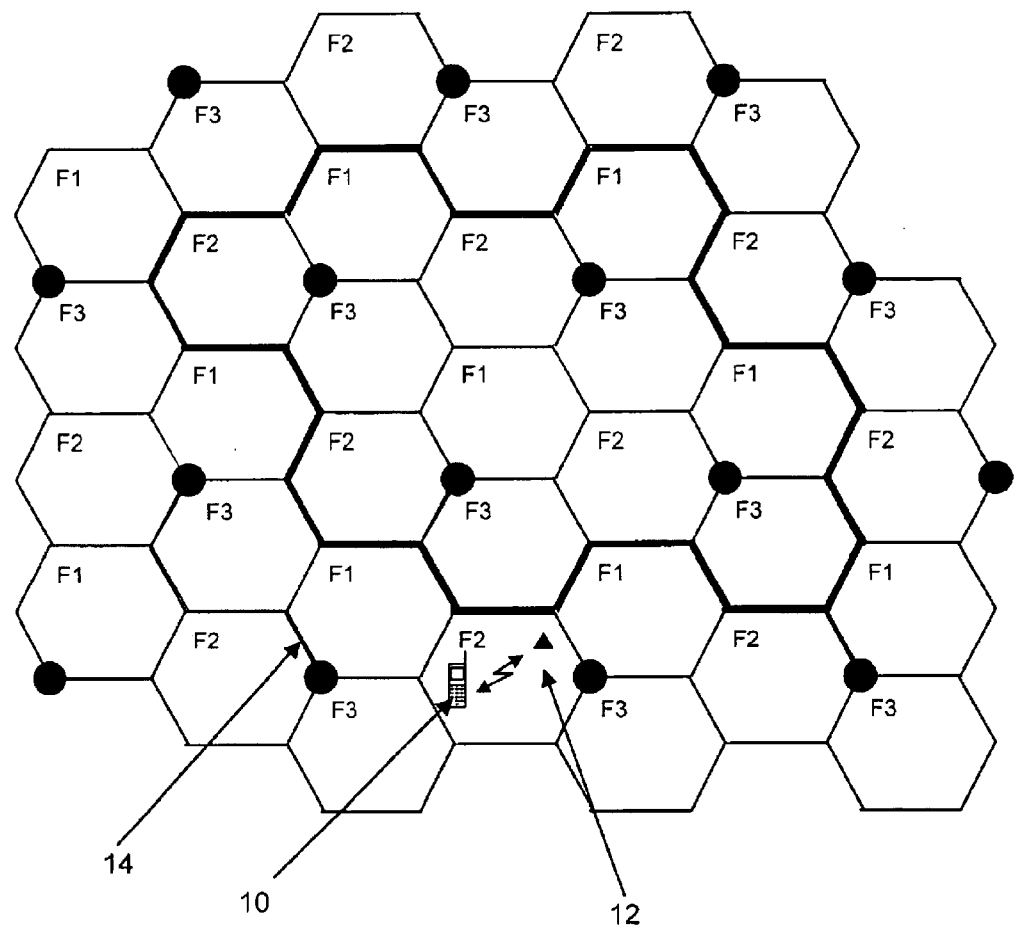
FIG. 1 illustrates an exemplary cellular system where a base station is responsible for providing radio communication to a certain geographical area.

FIG. 1 illustrates an exemplary cellular system where a base station, 12, is responsible for providing radio communication possibilities to a certain geographical area. A mobile station, 10, may move between areas served by different base stations and communicate with different base stations, 14, dependent upon its position. In FIG. 1, a cellular pattern based on 3 frequencies or 3 frequency groups are illustrated. F1, F2 and F3. This is usually referred to as a 3 reuse pattern and indicate that there is a 3-repetition of frequencies, or, that a frequency is only used once every third cell. There are of course other ways to arrange the distribution of a number of frequencies for a group of cells, e.g., with other repetition patterns like 1, 9, 12 and 21.

FIG. 2 illustrates the time division specified for a GSM frequency. Every GSM frequency is divided into 8 different timeslots, where each timeslot form a communication channel for a circuit switched GSM connection. The downlink and uplink are identical in timeslot divisioning but separated in frequency. At least one timeslot on one frequency in each cell, e.g. TN0, is, in the downlink direction, allocated for common control channel and broadcast transmissions. The corresponding uplink timeslot is usually used for random access. i.e., a way to make the system aware of a mobile user's request for a communication channel. This is illustrated in FIG. 2, where timeslot 0, TN0, is shaded. The different timeslot transmissions are repeated in what is referred to as frames. There are several important frame repetition patterns in GSM, one being the 52-frame pattern illustrated in FIG. 2. The chronological order at which transmission occur is, e.g., frame 0 (TN0–TN7)-frame 1 (TN0–TN7)-frame 2 (TN0–TN7).etc. A speech frame in GSM is 20 ms. When the speech coder and the channel coder have processed the speech frame the resulting number of bits corresponds to what can be carried over the air in four full bursts on a time slot.

The packet switched modes designed for GSM, -GPRS and EGPRS, are in many ways similar to GSM. For example, the timeslot structure and frame divisioning are identical to GSM for the traffic channels. This means that much of what is specified for voice transmission over GSM circuit switched communication channels, may also hold for voice transmission on over GPRS packet switched communication channels. For example, a speech period may still be 20 ms. A 20 ms period in GPRS corresponds to the transmission of four frames and for one timeslot in GPRS and EGPRS this is often referred to as a block period, or block for short.

There are several different speech codecs developed for GSM, the most recent being the Adaptive MultiRate (AMR) speech codec. This speech codec has an adaptive output of speech information bits. When these bits are combined with an adaptive portion of channel coding the total number of bits adds up to a constant number, i.e., constant gross rate. For example, with a very good channel quality, there is no need to use a large amount of channel coding bits. The transmitted bits may instead comprise a larger amount of speech information. For a poor quality, more protection is needed, and channel coding bits are required, at the cost of speech codec information. However, the gross bit rate over the air, i.e., speech codes information+channel coding bits, does not vary with the AMR codec in GSM. This quality adaptation may be performed on speech frame basis and results in higher perceived quality.

A similar strategy to the GSM AMR is also being considered for voice communication over a packet switched channel, like a GPRS or EGPRS channel.

Considering now the SID transmissions for voice connections in silent mode for GSM AMR as an exemplary case. In the AMR coder, the SID occupies every eighth block. This means that, for circuit switched voice communication, 7/8 of a communication channel (i.e., timeslot) is unused during silent periods. In a packet switched communication system, it would be advantageous to utilize the resources for other users during this 7/8 of the time. A user, U1, engaged in a voice connection, is allocated downlink transmission resources on timeslot number 3, TN3, for transmission of speech information. When user U1 enters a period of silence in the speech flow, for example after a sentence, awaiting an answer in the other direction, a Voice Activity Detector (VAD) detects the start of a silent period. In GSM, this VAD triggers a decrease of output transmission power on TN3, since there is no speech information to send. The transmission of SIDs also starts with the VAD indication of a silent period. For GSM AMR, the SID blocks are transmitted with a 160 ms repetition cycle.

According to one aspect of the present invention, in order to enable, e.g., a GSM AMR like approach a so for GPRS, a packet switched SID communication channel is defined. The packet switched SID communication channel has similar functionality to the circuit switched SID channel in GSM, although with a multiplexing method that intelligently utilizes the more liberal multiplexing techniques allowed in a packet switched system.

The downlink direction of the SID communication channel is illustrated as TN0 in FIG. 3. According to the invention, the SID transmissions are not transmitted on the same channel as the speech blocks. Instead, SID transmissions, e.g., SID(1) for user U1, are transmitted on a separate SID communication channel. This is illustrated in FIG. 3. Thus, upon entering a silent period by receiving a first SID(1) on TN3, user U1 is reallocated to the SID communication channel on TN0 and may there start to receive SID blocks periodically. The advantage of re-allocating a silent user, is that TN3 in the downlink becomes available for other continuous communication flows. For example, if a user U2 is about to leave the downlink SID channel upon entering a speech period, user U2 may be allocated to TN3 for its next speech period. This is illustrated in FIG. 3, showing that user U1, after receiving the first SID(1) on TN3, switches to the SID communication channel TN0 while user U2, ending a silent period, receives a first speech block on the SID communication channel containing a reallocation indication to TN3.

FIG. 3 illustrates an exemplary SID communication channel that handles N-m different users in silent periods simultaneously. N corresponds to the repetition rate of SID transmissions, e.g., in GSM with AMR speech codec, 160 ms. m corresponds to a number of blocks that are not allocated in any repetitive SID transmissions. The m spare blocks are reserved for use when a user leaves a silent period.

For example, when user U2 starts to receive speech data in the downlink again after a silent period, there is a need to allocate resources for speech information transmission. According to one embodiment of the present invention, a base station transmits the first speech block after a silent period on the SID communication channel, as illustrated in FIG. 3. An MS in a downlink silent mode always listens to the SID communication channel and thus receives the first speech block intended for it. The first speech block after a silent period may be coded with less speech information bits, if necessary, to allow transmission of an allocation indication included in the first speech block transmitted on the SID communication channel. To be able to allocate resources for the second and following speech blocks, the first speech block may contain a message, such that a user U2 is informed where the following downlink speech block will be sent. After having received the first speech block on the SID communication channel, the user leaves this channel and moves to the channel indicated in the allocation message, in this example TN3, where subsequent blocks may be received.

By transmitting the first speech block, along with an allocation indication, reserved resources for SID transmissions may be "stolen". Since a first speech block advantageously is transmitted without any delay, it is possible that it "steals" resources from soma other users SID transmission now. For example, user U2, listening to SIDs SID(2) may receive a first speech block in a position usually used for SID transmissions to a user U3, receiving SID (3). This is handled such that any of the last m spare blocks in the repetition pattern may take care of the SID (3) transmission instead, since this is not as delay sensitive as the first speech block to user U2. The last m blocks are thus used for transmitting "stolen" SIDs. Occasionally, the first speech blocks will be transmitted in one of these m blocks, if the downlink communication resumes during that period.

Note that when a speech user is reallocated from a speech communication channel, it may also receive its first SID block on the speech communication channel.

The allocation messages, although illustrated for the downlink in FIG. 3, may also reallocate uplink communication.

Figure 4:
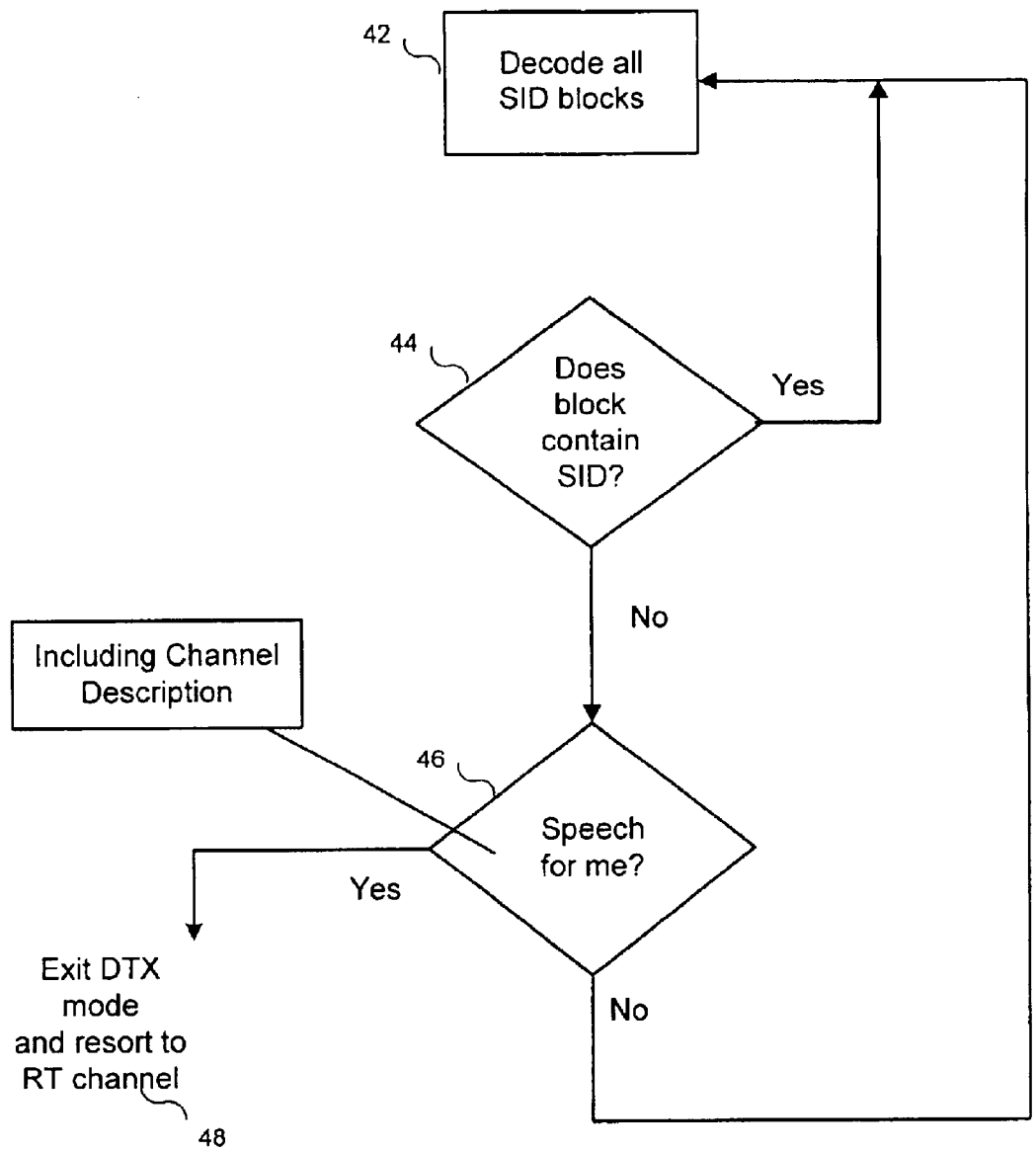
FIG. 4 illustrates procedures in the mobile station when in a downlink silent period on the SID communication channel, according to one embodiment of the present invention.

FIG. 4 illustrates the procedure to be followed on the mobile terminal side when the downlink is in a silent period, and is therefore allocated on a downlink SID channel. In 42, the mobile decodes all the SID blocks, even those intended for other users. The mobile only updates its SID information when blocks with a matching address are decoded. As long as the decoded blocks are identified as SID blocks, this procedure continues, 44. At one point, when the silent period for a connection is terminated in the downlink, the system will send, in the first occurring SID position, a first data (e.g. speech) block in the downlink, together with a channel allocation description, 46. A mobile will make a check in an address field to identify if the speech block has a matching address or if it is intended for another user. If it is intended for another user, the mobile ignores the block and the procedure continues. If the address is matching with that of the mobile, it will leave the silent mode, decode the speech block and move to a new communication channel, e.g., timeslot/frequency as indicated in a channel allocation description, and continue to receive downlink speech blocks on the new channel, 48.

Figure 5:
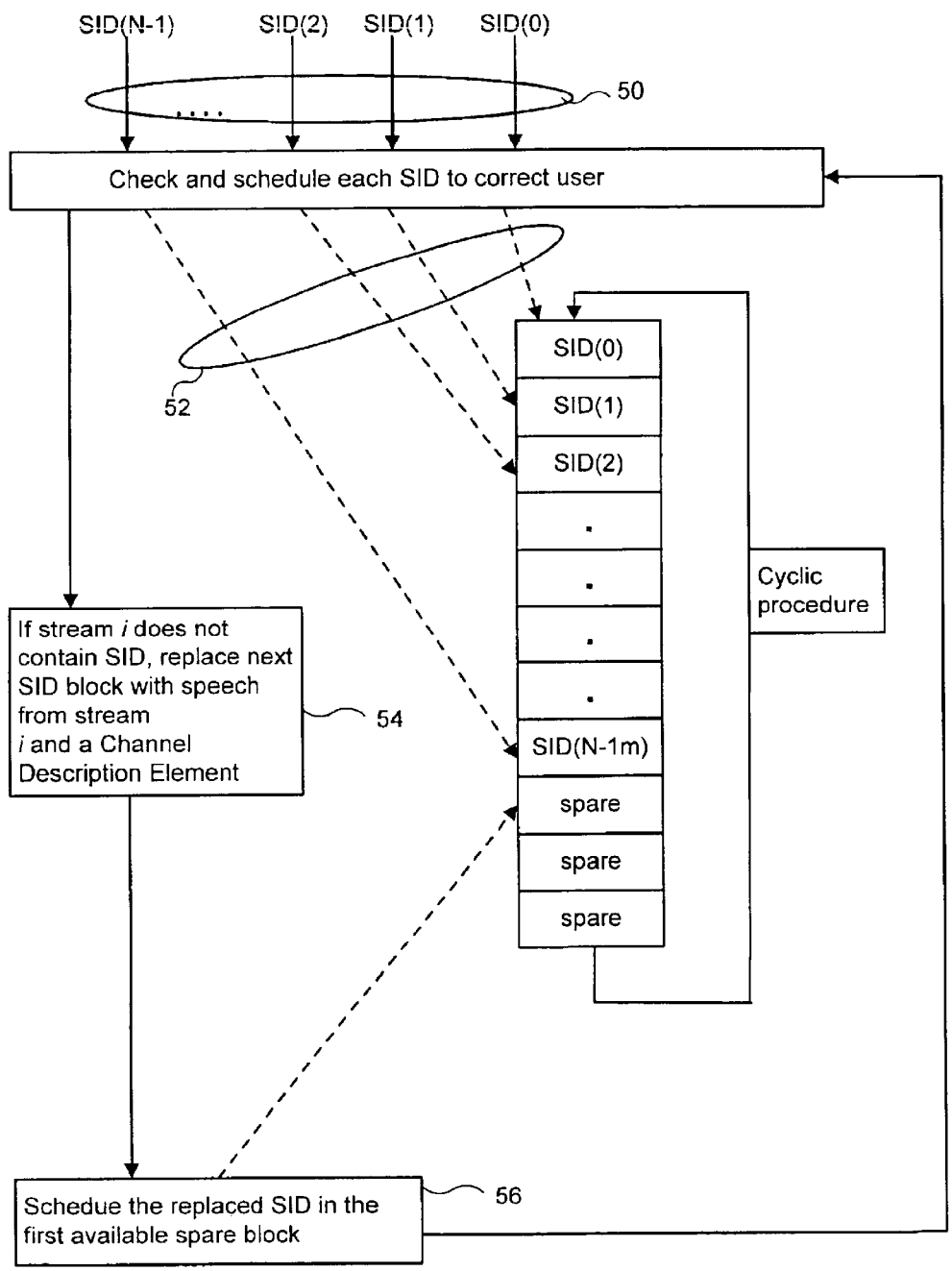
FIG. 5 illustrates procedures in the network side for the downlink SID communication channel according to the present invention.

FIG. 5 illustrates the network side of the downlink SID allocation according to the present invention. A scheduler continuously receives SID information, 50, and schedules this on the SID communication channel according to a predetermined repetition pattern, 52. If there is no "first speech block" to any of the users in silent mode on the SID channel, the scheduler will not map any information to the last m spare blocks in the repetition cycle, 54. If there is a "first speech block" arriving, this will be immediately scheduled and transmitted and, if an outstanding SID is deprioritized in this procedure, this SID will be sent in one of the m spare blocks, 56.

With the above described handling of the SID transmissions, it is possible to multiplex speech users in the downlink in a more efficient way than if the SID transmissions were allocated in the same way as for circuit switched voice communication, -on the same communication channel as the speech blocks. Utilizing the present invention, implementation of statistical multiplexing for real time users will be facilitated.

Turning now to FIG. 6, an exemplary uplink SID allocation corresponding to the downlink described for FIG. 3 is illustrated. The uplink SID communication channel does however not include any scheduled spare blocks, corresponding to the m spare blocks described for the downlink. This is explained by the fact that the uplink resources are allocated to a number of distributed mobile users and it is difficult to control and redirect uplink SID transmissions to other blocks than those reserved for a certain user. After having ended a speech period in the uplink, a user U1 moves to the common uplink SID communication channel where the periodic transmission of SID (1) starts. The periodicity of the SID transmissions can be indicated in an allocation message at call setup, or in the SID allocation message transmitted in the beginning of a silent period. Note that the allocation messages, although indicated for the uplink in FIG. 6, may also reallocate downlink communication.

Figure 7:
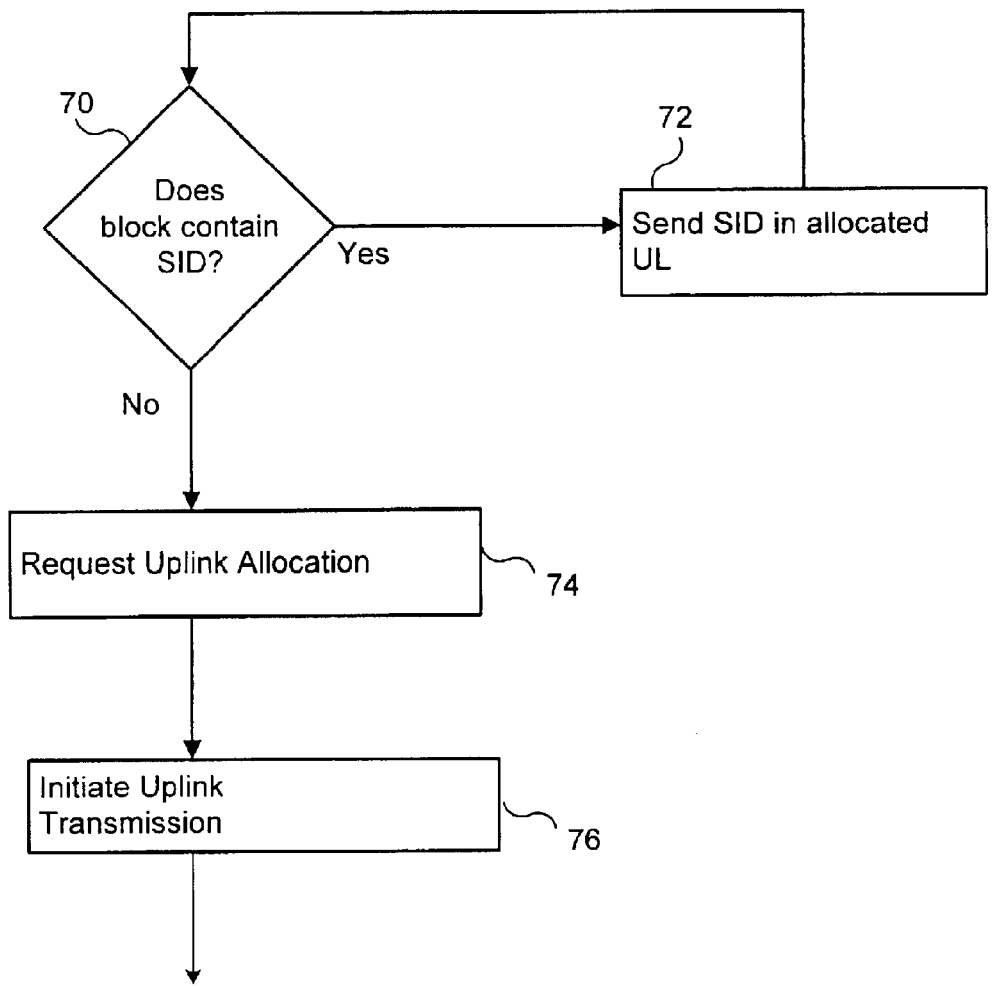
FIG. 7 illustrates procedures in the mobile station when in an uplink silent period on the SID communication channel, according to one embodiment of the present invention.

FIG. 7 illustrates the MS procedure for uplink handling of silent periods on the SID communication channel. The SID number indicates which SID block the user is allocated when in a silent period. When the silent period has started, the transmitter part of the MS analyzes the content, 70, of the output from the speech codec and if it contains SID, the SID is sent on the allocated SID channel block, 72. (Note that the first SID in the uplink is transmitted together with a SID reallocation request on the speech communication channel, e.g., TN3 as illustrated in FIG. 6.) if the content is a "first speech block" after a silent period, the MS may immediately request and uplink allocation 74 via, e.g., a random access channel. After the uplink allocation is given, the MS initiates uplink transmission on the new uplink communication channel, 76.

For the uplink SID communication channel, the network receives SID transmissions according to the scheduled allocation and forwards them to respective packet switched connection end users or nodes. Should the network receive an access request from a user in a silent period, top priority is given to an uplink allocation for that user. The access burst may be sent on a random access channel which may either be allocated on another physical channel than the uplink SID communication channel, or alternatively share resources with the SID communication channel. It should be noted that since it is the base station that determines the allocation even for the uplink, there may be some additional delay experienced when leaving the uplink silent period.

According to another aspect of the present invention, the SID transmission resources may be shared with transmission of signalling, or control, information. In the present GSM system, a signalling channel called Slow Associated Control Channel, SACCH, is defined. This channel is typically used for, e.g. transmission of measurement reports and system information messages. It is defined for both the up and the downlink. A variant of this circuit switched SACCH is also needed for a real-time session over a packet switched connection. This packet switched SACCH is hereafter referred to as PSACCH.

In a spent period, it is possible to allow the SID transmissions to share transmission resources with the PSACCH transmissions to or from a mobile station. For example, in GSM AMR, the normal rate for SID blocks is 160 ms, i.e., SID information is updated each 160 ms period. This high repetition rate is important since the SID blocks also contain adaptation information for the AMR codec. The normal period for a SACCH transmission is 480 ms, and this could also be used for a PSACCH. With the described SID communication channel. It is possible to allow for a maintained PSACCH transmission period and lower the update rate of SID information to alternating periods of 160 and 320 ms. This is illustrated in FIG. 8 where each $3^{rd}$ SID transmission is replaced with an PSACCH transmission (It should be noted that other ways of allocating PSACCH every $3^{rd}$ block are possible and FIG. 8 only shows an exemplary alternating method). Thus, according to this aspect of the invention, the PSACCH transmissions does not need to be allocated any additional transmission resources than those used for SID transmissions. The blocks carrying the PSACCH information can also hold AMR adaptation information for the purpose of a continuous AMR update.

Figure 9:
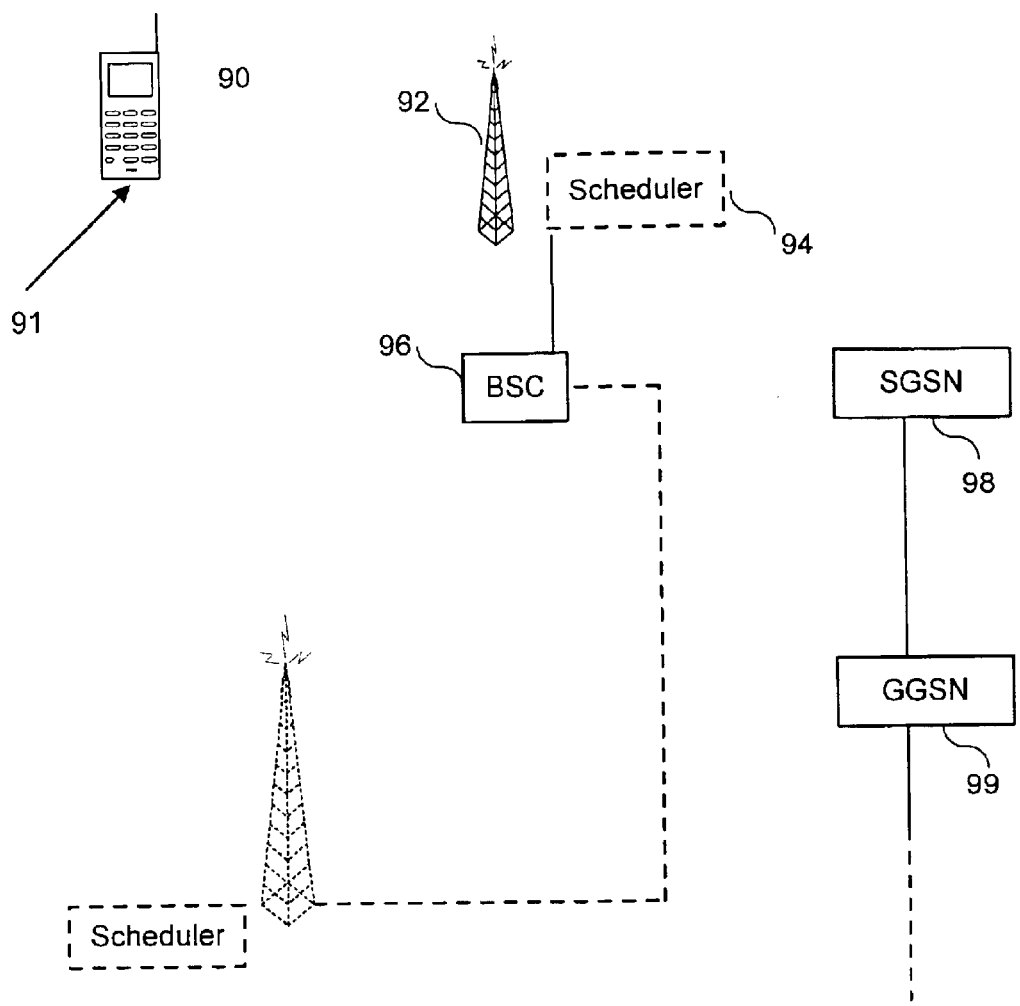
FIG. 9 illustrates an exemplary cellular system and a mobile station including means for supporting SID and PSACCH allocations according to the present invention.

FIG. 9 illustrates a GPRS communication system according to several embodiments of the present invention. A real time user 90 may communicate with the fixed part of the cellular system via a serving base station 92. The serving base station may host a scheduler, 94, for the physical channels utilized in the base station's coverage area. The base station is connected to a a Base Station Control node, BSC, 96, which in turn is connected to a Serving GPRS Support Node, SGSN, 98, serving one or several BSCs. The SGSN is typically the node controlling the packet flow to and from the different base stations, via the BSCs. Another GPRS support node is a Gateway GPRS Support Node, 99, connected to e.g., internet or other external networks (not illustrated). The scheduler, 94, is in this example located in the base station, but may alternatively be housed in any other network node. Scheduling functionality may also be split between different nodes in the system. The scheduler, 94, will control the allocation of SID blocks onto a SID communication channel. Different users, carrying different temporary identities, will be allocated to repetition patterns according to the methods described previously. For the downlink, the scheduler, 94, will schedule SID transmissions and, at occurrence, replace SID transmissions with a "first speech block" transmission instantly upon arrival. The scheduler, 94 will also allocate resources from the m spare blocks to send outstanding SID transmissions. Similarly, in mobile station 90, transmission means 91 are included. The transmission means 91 is responsible for transmitting SID blocks in the uplink according to the repetition pattern indicated by the network for uplink SID transmissions. When a SID and an PSACCH information flow is multiplexed according to one embodiment of the present invention, the transmission means 91 is responsible for transmitting the PSACCH and SID transmissions according to the allocation scheme as indicated by the network.

Additionally, according to one aspect of the present invention, the scheduler, 94, include means for allocating resources to PSACCH transmissions on the SID communication channel at a certain repetition rate, and replace SID transmissions to users in silent periods with PSACCH transmissions.

Although the present invention has been described with examples from a packet switched communication system compliant to the GPRS/GSM specifications, it should be noted that the solutions presented is equally well applicable to any other packet switched data communication system with the same or similar structure and functionality. The specific embodiments should therefore be considered exemplary rather than limiting the scope of the invention. The invention should rather be defined by the following claims:

What is claimed is:

1. In a packet switched mobile communication system where delay sensitive information contains speech information, said delay sensitive information being transmitted to a first mobile station on a first communication channel, a method for routing data communications to and receiving data communications from a plurality of mobile stations, said method comprising:

transmitting a silence descriptor (SID) on a second communication channel to the first mobile station, wherein the SID is associated with the delay sensitive information being transmitted on the first communication channel;

detecting the SID on the second communication channel and reallocating said first mobile station to said second communication channel, whereupon after said reallocation, said first mobile station then receiving a first block of said delay sensitive information via said second communication channel; and switching said first mobile station to said first communication channel for receiving subsequent blocks of delay sensitive information associated with said first block of said delay sensitive information received on said second communication channel.

2. The method of claim 1, wherein said first block of said delay sensitive information includes a reallocation message for reallocating said first mobile station to said first communication channel for receiving said subsequent blocks of delay sensitive information associated with said first block of said received delay sensitive information.

3. The method of claim 1 wherein unused frames in said first communication channel, originally designated for said first mobile station are filled with blocks of delay sensitive information intended for a second mobile station.

4. The method of claim 1, wherein said second communication channel is primarily utilized to sequentially transmit the SIDs to and from said plurality of mobile stations.

5. The method of claim 1, wherein said transmitting further comprises repetitively transmitting SID information to each of said plurality of mobile stations on said second communication channel.

6. The method of claim 1, wherein the step of transmitting SID information comprises sending SID information on the second communication channel to each of said plurality of mobile stations, wherein each of said plurality of mobile stations being in a silent period triggers SID transmission.

7. The method of claim 1, further comprising:

transmitting Packet Slow Associated Control Channel (PSACCH) related information on the second communication channel.

8. The method of claim 1, wherein:

the transmitting of the SID comprises transmitting the SID to a mobile station of the packet switched mobile communication system.

9. The method of claim 1, wherein:

the transmitting of the SID comprises transmitting the SID to a base station of the packet switched mobile communication system.

10. An apparatus for routing data communications to and receiving data communications containing delay sensitive information from a plurality of mobile stations on a first communications channel, said apparatus comprising:

detection means for detecting a silence descriptor (SID) associated with the delay sensitive information intended for a first mobile station, in a second communication channel;

means for reallocating the first mobile station to the second communication channel following detection of the SID;

transmission means for transmitting a first block of delay sensitive information to the first mobile station on the second communication channel prior to reallocation of the first mobile station to the first communication channel, whereupon after reallocation means for transmitting subsequent blocks of the delay sensitive information associated with said first block of delay sensitive information to the first mobile station via the first communication channel.

11. The apparatus of claim 10, wherein the first and second communication channels are downlink communication channels.

12. The apparatus of claim 10, wherein:

the first and second communication channels are uplink communication channels.

13. The apparatus of claim 10, further comprising:

a means for detecting a transmission of SIDs associated with the first mobile station on one or more communication channels other than the second communication channel; and signaling means for notifying the first mobile station of a reallocation to the second communication channel following the detection of a SID associated with the first mobile station.

14. The apparatus of claim 10, further comprising:

a means for detecting transmission of said delay sensitive information on the second communication channel.

15. The apparatus of claim 14, wherein the apparatus further operates to:

transmit a message to the first mobile station identifying the other communications channel to which the first mobile station is to be reallocated.

16. The apparatus of claim 10, wherein transmission of the first block of delay sensitive information, occurs in a block of time reserved for transmitting SID information to a different mobile station.

17. The apparatus of claim 16, wherein the apparatus further operates to:

transmit SID information to the mobile station on the second communications channel in a block that is not reserved for SID transmission to any mobile station.

18. The apparatus of claim 10, wherein the apparatus comprises a base station.

19. The apparatus of claim 10, wherein the apparatus further operates to:

periodically transmit Packet Slow Associated Control Channel (PSACCH) Information and SID information on the second communications channel.

20. A method of communicating information in a cellular telecommunications system comprising:

receiving data communications containing delay sensitive information on a first communications channel;

detecting transmission of a silence descriptor (SID) in a first communication channel intended for a first mobile station;

reallocating the first mobile station to the second communication channel following the detection of the SID associated with the first mobile station; and sending a first block of delay sensitive information to the first mobile station via the second communication channel prior to the reallocation of the first mobile station to the first communications channel; and sending subsequent delay sensitive information associated with said first block of delay sensitive information to the first mobile station via the first communication channel.

21. The method of claim 20, wherein the first and second communication channels are downlink communication channels.

22. The method of claim 20, wherein:

the first and second communication channels are uplink communication channels.

23. The method of claim 20, further comprising:

detecting a transmission of SIDs associated with a plurality of mobile stations on one or more communication channels other than the second communication channel; and reallocating the plurality of mobile stations to the second communication channel following detection of the SIDs that are associated with each of the plurality of mobile stations.

24. The method of claim 20, further comprising:

detecting transmission of delay sensitive information with intended for the first mobile station, on the second communication channel; and responsive to the detection of the delay sensitive information, reallocating the first mobile station to the first communication channel.

25. The method of claim 24, further comprising:

transmitting a message to the first mobile station identifying the other communications channel to which the first mobile station is reallocated.

26. The method of claim 20, wherein the transmission of the first block of delay sensitive information to the first mobile station occurs in a block of time reserved for transmitting SID information to a second mobile station.

27. The method of claim 26, further comprising:

transmitting SID information to the second mobile station on the second communications channel in a block that is not reserved for SID transmission to any mobile station.

28. The method of claim 20, further comprising:

periodically transmitting PSACCH information and SID information on the second communications channel.

* * * * *